| United States Patent [19] | [11] Patent Number: 4,478,605 |
| Firth | [45] Date of Patent: Oct. 23, 1984 |

[54] ALKYLATED 5,6,7,8-TETRAHYDRONAPHTHALENOLS AS ANTIOXIDANTS

[75] Inventor: Bruce E. Firth, Arlington Heights, Ill.

[73] Assignee: UOP Inc., Des Plaines, Ill.

[21] Appl. No.: 488,227

[22] Filed: Apr. 25, 1983

Related U.S. Application Data

[63] Continuation-in-part of Ser. No. 299,707, Sep. 8, 1981, Pat. No. 4,392,969.

[51] Int. Cl.³ .............................................. C10L 1/18
[52] U.S. Cl. ........................................ 44/78; 252/404
[58] Field of Search ...................... 44/78, 58; 252/404

[56] References Cited

U.S. PATENT DOCUMENTS

| 2,116,220 | 5/1938 | Shoemaker | 252/404 X |
| 2,264,893 | 12/1941 | Shoemaker et al. | 252/404 X |
| 2,264,896 | 12/1941 | Bahlke | 252/404 X |
| 2,270,577 | 1/1942 | Bergstrom et al. | 252/404 X |
| 2,903,368 | 9/1959 | Thompson | 44/78 |
| 3,185,735 | 5/1965 | Leis et al. | 252/407 X |

*Primary Examiner*—Y. Harris-Smith
*Attorney, Agent, or Firm*—James R. Hoatson, Jr.; Eugene I. Snyder; William H. Page, II

[57] ABSTRACT

Alkylated 5,6,7,8-tetrahydronapthalenols are effective antioxidants for fuel oils. Di- and tri-alkylated tetrahydronaphthalenols are especially effective, with the di- and tri-isopropylated materials being preferred, at a concentration as low as about 5 ppm.

13 Claims, No Drawings

ALKYLATED 5,6,7,8-TETRAHYDRONAPHTHALENOLS AS ANTIOXIDANTS

CROSS-REFERENCE TO RELATED APPLICATION

This application is a continuation-in-part of my copending application Ser. No. 299,707, filed Sept. 8, 1981, now U.S. Pat. No. 4,392,969 which is incorporated herein by reference.

BACKGROUND OF THE INVENTION

A persistent problem common to virtually all petroleum products and petroleum-related products is their tendency to undergo oxidative degradation. Oxidation may occur even under the relatively mild conditions attending storage and transport of, e.g., fuel oils, and is appreciably accelerated when operating conditions are conducive to oxidative processes, for example the elevated temperatures experienced by lubricating oils. Such oxidative processes not only cause chemical degradation of the petroleum or petroleum-related product, but may also cause appreciable changes in desirable physical properties, such as viscosity, which lead to a deterioration in performance of the product. Additionally, the oxidative products themselves may attack materials in contact with petroleum and petroleum-related products, such as metals in contact with transmission or lubricating oils, thereby inducing inefficient performance and, in some cases, even structural failure.

It has been known for some time that certain hydroxy aromatic compounds are effective antioxidants useful in a wide range of applications. For example, the food additive commonly known as BHA is 2-t-butyl-4-methoxyphenol. Other phenols have been utilized as antioxidants in petroleum products, in plastics, in lubricants, and in other applications where increased oxidative stability is desired. Certain polyalkylated hydroxysubstituted aromatics are especially effective antioxidants. Thus, 2,4-di-t-butylphenol is of commercial utility as an antioxidant and stabilizer when added to fuel oils. However, because of their physical properties the use of hydroxy aromatic compounds as antioxidants in the past has been limited to relatively low temperature applications.

It now has been found that alkylated 5,6,7,8-tetrahydronaphthalenols exhibit antioxidant properties over a wide temperature range and possess the necessary chemical and physical properties to permit their use in higher temperature applications, such as transmission oils, as well as lower temperature application as, for example, in storage of fuel oils.

SUMMARY OF THE INVENTION

An object of this invention is to provide a method of inhibiting oxidation of petroleum and petroleum related products and compositions for use therein. In an embodiment of this invention, the additives are mono- and polyalkylated 5,6,7,8-tetrahydronaphthalenols. In a more specific embodiment the additive is diisopropyl-5,6,7,8-tetrahydro-2-naphthalenol. In a still more specific embodiment, the method comprises adding from about 5 ppm to about 5 wt. % of said naphthalenol to a fuel oil. Other objects and embodiments will be apparent from the description within.

DESCRIPTION OF THE INVENTION

The subject matter of this invention is the use of alkylated tetrahydronaphthalenols as additives in fuel oils to retard their oxidation, and compositions therefor. The additives described herein are alkylated derivatives of materials commonly known as hydroxytetralins. More specifically, the additives of this invention are 5,6,7,8-tetrahydro-1-naphthalenols and 5,6,7,8-tetrahydro-2-naphthalenenols where the aromatic ring is mon-, di- or trialkylated, and the dehydrocyclization products of the trialkylated tetrahydronaphthalenols.

One group of additives of this invention has the structure,

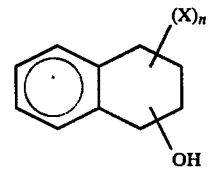

where X is an alkyl group. It will be recognized that if n is 0, the materials are the parent tetrahydronaphthalenols. In this invention, n is 1, 2 or 3, with the preferred materials being at least disubstituted naphthalenols. Thus, in this branch the additives are monoalkyl-, dialkyl- and trialkyl-5,6,7,8-tetrahydronaphthalenols, where each alkyl group contains from 3 to about 16 carbon atoms.

Each alkyl group, X, may be represented as $R_1R_2R_3C$, where $R_3$ is selected from the group consisting of hydrogen and alkyl groups containing up to about 14 carbon atoms, and $R_1$ and $R_2$ are independently selected from the group consisting of alkyl groups containing up to about 4 carbon atoms, subject to the limitation that X contains up to about 16 carbon atoms. Examples of such alkyl groups include methyl, ethyl, propyl, butyl, pentyl, hexyl, heptyl, octyl, nonyl, decyl, undecyl, dodecyl, tridecyl, and tetradecyl. It is to be emphasized that although each alkyl group, X, normally will be the same, this is not necessarily so and the invention is not limited thereto. Examples of preferred alkyl groups include isopropyl, isobutyl, and tert-butyl.

The other group of additives of this invetion are the dehydrocyclization products of the trialkyltetrahydronaphthalenols described above. Such dehydrocyclization products arises from the loss of a hydrogen on a carbon atom alpha to the ring of one alkyl group, and a hydrogen on a carbon atom beta to the ring of an adjacent alkyl group, with formation of a bond between the specified carbon atoms. In the case where the alkyl group is isopropyl and a 1-naphthalenol is involved, the additives in this group have structures such as,

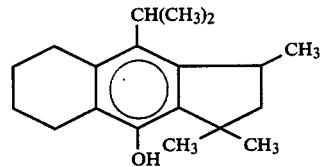

-continued

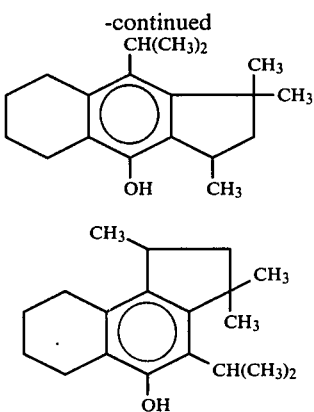

The additives of this invention may be prepared by acid catalyzed alkylation of the 5,6,7,8-tetrahydronaphthalenol. Among the acids which may be used are conventional acids, such as sulfuric and phosphoric acids. Lewis acids may be advantageously employed and include silica, alumina, boron trihalides, and aluminum trihalides. It has been found that fluorided alumina affords products at modest temperatures with a minimum of oligomerization when the alkylating agent is an olefin, and hence is a preferred catalyst.

Fluorided alumina is a product wherein fluoride ions have been deposited in the alumina matrix. It may be prepared, for example, by contacting alumina with a solution of ammonium fluoride, evaporating the water while mixing, and calcining the resulting product. Another mode of preparation, by way of example, is passage of gaseous hydrogen fluoride over solid alumina, wherein the contact time and the total amount of hydrogen fluoride to which the alumina is exposed will determine the final fluoride content of the product. The efficacy of the fluorided alumina catalyst depends on the fluorine content of the catalyst. Preparations containing from about 0.3 to about 5 wt. % fluorine are preferred, and those from about 0.3 to about 2 wt. % fluorine are particularly preferred. When fluorided alumina is used as a catalyst, reaction temperatures may be from about 150° C. to about 350° C. and even higher, but the maximum reaction temperature is preferably about 250° C. The desirable characteristics of this catalyst permit operation at a pressure in excess of about 10 atmospheres, with the reaction time being from about 1 to about 20 hours.

The olefins used in the preparation of the additives of this invention have up to about 16 carbon atoms and have the structure $R_1R_3C=CHR_4$, where $R_1$ and $R_3$ conform to the description given above for the alkyl group, X. The group $R_4$ is selected from the group consisting of hydrogen and alkyl groups containing up to about 13 carbon atoms. Examples of such alkyl groups have been furnished above. Specific examples of olefins which may be employed include propylene, butylene, the isomeric amylenes, isomeric hexylenes, isomeric heptylenes, isomeric octylenes, isomeric nonylenes, isomeric decylenes, and linear internal olefins resulting from commercial dehydrogenation of n-alkanes in the $C_{10}-C_{16}$ range. Propylene and butylene are especially desirable olefins.

The process of this invention may be utilized in the batch mode. For example, a suitable reactor, such as that of the rocking autoclave type, is charged with a desired amount of tetrahydronaphthalenol and fluorided alumina. The olefin is added, and if it is desired to conduct the reaction at a pressure other than that indigenous to various components, a suitable inert gas is admitted to the desired pressure. The reactor is sealed, mixing is commenced, and the contents are heated to the predetermined temperature. This reaction temperature is maintained for the time necessary for optimum yield of the alkylated product, generally from about 1 to about 20 hours. After the mixture is cooled, the apparatus is vented, catalyst is removed by suitable means, for example, by filtration, and product is recovered.

The process of this invention may also be practiced in a continuous mode. A reactor may contain a bed of fluorided alumina heated and maintained at the desired temperature. A mixture of the tetrahydronaphthalenol and the olefin may be passed through the bed at a rate such that the total contact time of reactants optimizes the product composition. Olefin and unconverted reactant may be separated from the effluent and recirculated. Product then may be recovered from the effluent by suitable means, as for example by distillation.

The additives described herein are effective antioxidants for stabilizing fuel oils. Examples of fuel oils which may be so stabilized include gasoline, diesel fuel, jet fuel, other aviation fuel, kerosene, burner oil, furnace oil, and naphtha. When used in fuel oils, the additives of this invention are present in amounts from about 5 ppm to about 5 wt. %, with the preferred range being from about 5 ppm to about 500 ppm by weight.

The examples given herein are merely illustrative of this invention and are not to be construed as limiting the invention thereto.

EXAMPLE 1

To 17 g of 5, 6, 7, 8-tetrahydro-1-naphthalenol in 30 ml of toluene was added 15 g of 1% fluorided alumina. The mixture was loaded into a 300 ml rocking autoclave and charged with 48 ml of propylene. The mixture was heated to 250° C. for 4 hours, with the initial pressure being 52 atmospheres. After cooling, the reaction mixture was filtered and solvent was evaporated to afford 22.5 g of liquid whose analysis by gas liquid partition chromatogrphy (GLPC) showed about 24% of unreacted starting material and 3 major alkylation products. Mass spectrometric examination indicated the 3 materials were a diisopropylated and triisopropylated 5, 6, 7, 8-tetrahydronaphthalenol, and a naphthalenol with the structure

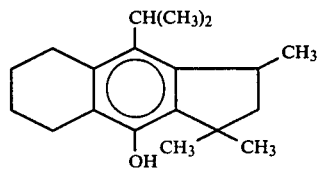

or its isomers. Gas chromatography indicated a relative ratio of these materials of 1:2.0:3.4, resp.

EXAMPLE 2

To a mixture of 15 g of 5, 6, 7, 8-tetrahydro-2-naphthalenol in 40 ml of toluene containing 21 g of fluorided alumina in a 300 ml autoclave was added 48 ml of propylene. The mixture was heated to 250° C. at which time the pressure was about 50 atmospheres. After 4 hours the mixture was cooled, and solid was separated from the cooled mixture by filtration and solvent was removed by evaporation to afford 21 g of a liquid. Examination by GLPC showed no starting material, one major peak corresponding to a diisopropylated 5, 6, , 8-tetrahydronaphthalenol, and smaller amoiunts of monoisopropylated and triisopropylated naphthalenol. It is likely that alkylated materials having the indane-type structure similar to that described in Example 1 also are present.

EXAMPLE 3

The effectiveness of materials as antioxidants in fuel oils was determined by measurement of the induction period, ANSI/ASTM method D525-74. The fuel oil was gasoline, with test results for various compositions being listed in the Table. As a comparison, there is included an antioxidant of wide commercial utility which consists of 2,6-di-t-butylphenol (75%), 2,4,6-tri-t-butylphenol (15%) and 2-t-butylphenol (10%) and which is designated by the symbol E733. Additives R1 and R2 are the reactant naphthalenols of Examples 1 and 2, respectively, while P1 and P2 are their respective products.

TABLE
PERFORMANCE AS FUEL OIL ANTIOXIDANT

| Additive | Concentration (ppm) | | |
| --- | --- | --- | --- |
| | 40 | 60 | 80 |
| none | | 105–110 | |
| P2 | 300$^a$ (285)$^b$ | 380 (345) | 425 (400) |
| R2 | 155 (270) | 170 (330) | 200 (385) |
| P1 | 210 (310) | 245 (370) | 275 (430) |
| R1 | 175 (280) | 195 (330) | 230 (375) |

$^a$Induction time in minutes.
$^b$All values in parenthesis refer to induction time of the standard, E733.

The data clearly show both products are effective fuel oil antioxidants, with that from Example 2 surpassing the commercial standard.

What is claimed is:

1. A composition comprising a fuel oil tending to undergo oxidation containing from about 5 ppm to about 5% by weight of an additive selected from the group consisting of monoalkyl-, dialkyl- and trialkyl-5, 6, 7, 8-tetrahydronaphthalenols, and the dehydrocylization products of said trialkyl-5, 6, 7, 8-tetrahydronaphthalenols, wherein each alkyl group contains from 3 to about 16 carbon atoms.

2. The composition of claim 1 where the fuel oil is selected from the group consisting of gasoline, diesel fuel, jet fuel, other aviation fuel, kerosene, burner oil, furnace oil, and naphtha.

3. The composition of claim 1 where the additive is a diisopropyl-5, 6, 7, 8-tetrahydronaphthalenol.

4. The composition of claim 1 where the additive is a triisopropyl-5, 6, 7, 8-tetrahydronaphthalenol.

5. The composition of claim 1 where the additive is a dehydrocyclization product of a triisopropyl-5, 6, 7, 8-tetrahydronaphthalenol.

6. The composition of claim 1 containing from about 5 to about 500 ppm additive.

7. A method of inhibiting oxidation in a fuel oil comprising adding thereto an oxidation inhibiting amount of an additive selected from the group consisting of monoalkyl-, dialkyl-and trialkyl-5, 6, 7, 8-tetrahydronaphthalenols, and the dehydrocylization products of said trialkyl-5, 6, 7, 8-tetrahydronaphthalenols, wherein each alkyl group contains from 3 to about 16 carbon atoms.

8. The method of claim 7 where the fuel oil is selected from the consisting of gasoline, diesel fuel, jet fuel, other aviation fuel, kerosene, burner oil, furnace oil, and naphtha.

9. The method of claim 8 wherein the effective amount is from about 5 ppm to about 5 wt. %.

10. The method of claim 9 where the effective amount is from about 5 ppm to about 500 ppm.

11. The method of claim 7 where the additive is a diisopropyl-5, 6, 7, 8-tetrahydronaphthalenol.

12. The method of claim 7 where the additive is a triisopropyl-5, 6, 7, 8-tetrahydronaphthalenol.

13. The method of claim 7 where the additive is a dehydrocyclization product of a triisopropyl-5, 6, 7, 8-tetrahydronaphthalenol.

* * * * *